United States Patent [19]

Shapiro et al.

[11] 3,872,944

[45] Mar. 25, 1975

[54] QUICK-CONNECT COUPLING STRUCTURES EMBODIED IN MOTORCYCLE FOR RAPID TAKE DOWN

[76] Inventors: Lawrence S. Shapiro, 8012 Dunfield, Los Angeles, Calif. 90045; Ralph H. Piel, 1226 Franklin Street, Calif.

[22] Filed: June 9, 1972

[21] Appl. No.: 261,194

[52] U.S. Cl. ............... 180/33 R, 280/278, 280/287
[51] Int. Cl. ............................................ B62k 15/00
[58] Field of Search .................. 180/33 R, 33 A, 32; 280/278, 279, 287, 288, 297; 287/103 R; 85/5 B

[56] References Cited
UNITED STATES PATENTS

| | | | |
|---|---|---|---|
| 1,427,402 | 8/1922 | Malec | 280/278 X |
| 1,482,944 | 2/1924 | Russ | 287/103 R |
| 2,522,867 | 9/1950 | Goldammer et al. | 180/32 |
| 2,600,767 | 6/1952 | Herrel | 180/33 R |
| 2,861,815 | 11/1958 | Willinger | 280/278 |

FOREIGN PATENTS OR APPLICATIONS

| | | | |
|---|---|---|---|
| 827,168 | 1/1952 | Germany | 180/33 A |
| 2,607 | 2/1898 | United Kingdom | 280/287 |
| 106,821 | 7/1927 | Austria | 280/297 |

Primary Examiner—Richard A. Schacher
Assistant Examiner—James L. Rowland
Attorney, Agent, or Firm—Nilsson, Robbins, Bissell, Dalgarn & Berliner

[57] ABSTRACT

A motorcycle construction is disclosed that can be simply and easily reduced to a compact (disassembled) form, as for storage or transportation. The construction involves three primary separable components (a front-wheel section, an engine section and a rear-wheel section) with some secondary separable components, i.e., handlebars, seat, fuel tank and rear fender. As disclosed, the front-wheel section is affixed to the engine section by independent major and minor frame couplings. The major coupling incorporates tapered surfaces that extend perpendicular to the axis of the coupling, so as to afford a rigid structure in which various applied loads are translated to a single tension fastener. The connection between the rear-wheel section and the engine section, as disclosed, utilizes a quick-connect torque fastener, a form of which is also employed to affix the separable handlebar unit to the front-wheel section. As disclosed, the engine section is received in a tray which bears wheels for ease of transportation independent of the other components.

3 Claims, 9 Drawing Figures

PATENTED MAR 25 1975 3,872,944
SHEET 1 OF 2
Fig. 1.
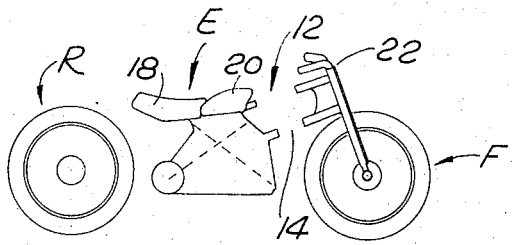
Fig. 2.
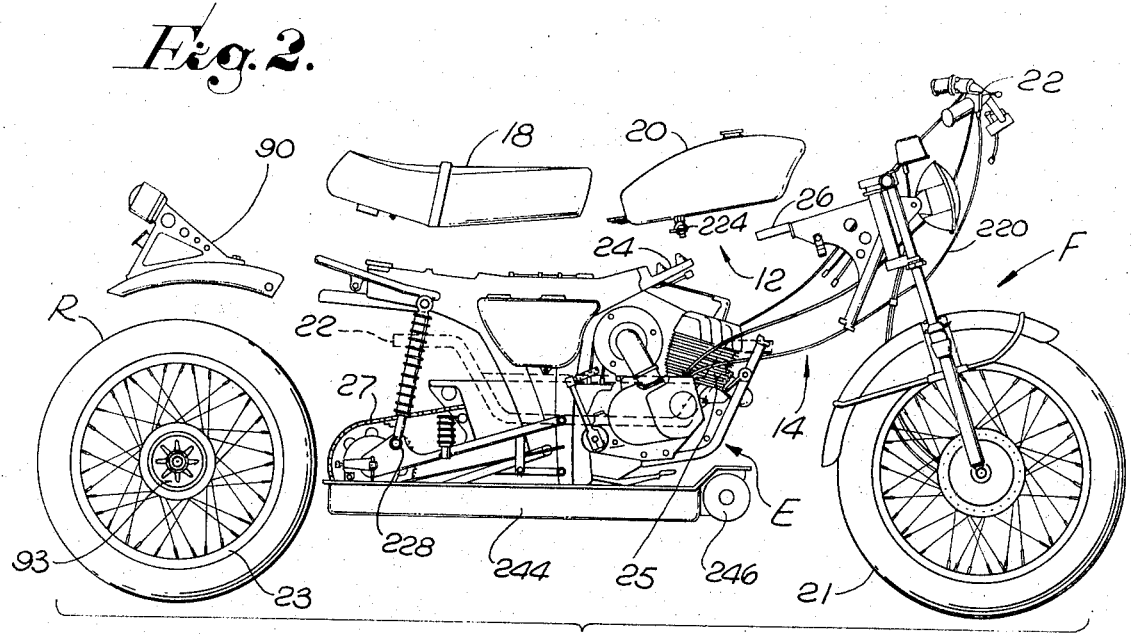
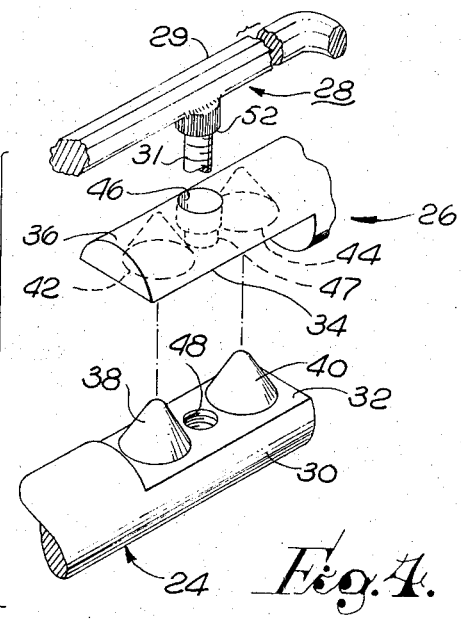
Fig. 3.
Fig. 4.

QUICK-CONNECT COUPLING STRUCTURES EMBODIED IN MOTORCYCLE FOR RAPID TAKE DOWN

BACKGROUND AND SUMMARY OF THE INVENTION

For a variety of reasons, the popularity of motorcycles or motor-powered bikes has vastly increased in recent years. As one consideration, the motorcycle is not restricted in use to roads, and consequently affords convenient access to remote areas. Of course, economy and the pleasure of riding are also relevant considerations.

Somewhat concurrently with the popularization of the motorcycle, expansion has also occurred in other facets of private transportation. Specifically, reference is made to the expanding numbers of airplanes, boats and recreational vehicles that are being used privately. Although such units are effective for their intended use, each has inherent limitations. For example, a light personal aircraft affords the user considerable flexibility and range; however, in the course of its use, severe ground-travel limitations are sometimes encountered on arrival at remote airstrips, or in some instances even at airports. Consequently, a substantial need exists for a means of transportation, i.e., a motorcycle, that may be conveniently carried in an aircraft, or other transportation unit, which motorcycle may be simply and easily transformed between a compact state for storage and a state for use to attain otherwise inaccessible areas.

The concept of a wheeled vehicle that is capable of being compacted to a convenient form, as for storage or transportation, is not novel. Specifically, for example, various forms of such units are disclosed in the following U.S. Pats. Nos.

2,525,877, Dolphin
2,705,156, Torre
2,839,146, Bouffort
3,212,596, Johnson
3,513,926, Paget
3,548,963, Schlaphoff Although a variety of vehicular structures have been previously proposed in a form reducible to a compact package, such structures have not come into widespread use. Consequently, a need continues to exist for a practical, economical, safe, rugged motorcycle that can be simply and easily reduced to a compact form or state. Generally, the present invention contemplates an improved motorcycle construction within the purview of these considerations, and which can be embodied in a practical vehicle readily usable either on highways or trails.

Generally, the present invention is directed to a motorcycle construction that may be readily taken down or disassembled into three major components or sections, i.e., a front-wheel section, an engine section and a rear-wheel section. The separation between the front-wheel section and the engine section involves a major coupling which is particularly well suited to the application and which incorporates mating tapered surfaces to attain inherent alignment as well as to translate applied load forces to a tension fastener. The junction between the engine section and the rear-wheel section involves an axial shaft member affording quick-connect operation along with a mechanism for tensioning the shaft to accomplish locking engagement. Other components of the motorcycle as disclosed herein, may also be separated, specifically including the handlebar structure, the fuel tank, the seat and the rear fender.

BRIEF DESCRIPTION OF THE DRAWINGS

In the drawings, which constitute a part of this specification, an exemplary embodiment exhibiting various objectives and features hereof is set forth, specifically:

FIG. 1 is a preliminary side view of a motorcycle constructed in accordance with the present invention, for illustrating the major separable components;

FIG. 2 is a detailed side view of a motorcycle constructed in accordance herewith depicted in a separated or taken-down state, and with the components positionally orientated;

FIG. 3 is a fragmentary view of a portion of the structure of FIG. 2 illustrating the components in an assembled state;

FIG. 4 is an exploded perspective view of a portion of the structure illustrated by FIG. 3;

DESCRIPTION OF THE ILLUSTRATIVE EMBODIMENT

Figure 5:
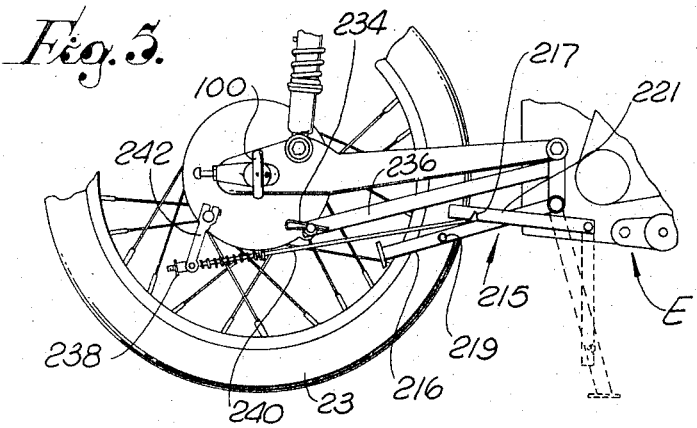
FIG. 5 is a fragmentary view of another portion of the structure of FIG. 2, illustrating the components in an assembled state.

As required, a detailed illustrative embodiment of the invention is disclosed herein. The embodiment exemplifies the invention which may, of course, be constructed in various other forms, some of which may be radically different from that disclosed herein. However, the specific structural details disclosed are representative and provide a basis for the claims which define the scope of the present invention.

Referring preliminarily to FIG. 1, the cycle construction hereof facilitates convenient separation of the vehicle into three major components or sections. Specifically, a front-wheel section F is separable from an engine section E, which is also separable from a rear-wheel section R. As suggested above and as explained in detail below, other separations are also provided in the illustrative embodiment; however, the major components are illustrated in FIG. 1.

Generally, the separability of the front-wheel section F and the engine section E involves a major coupling 12 (generally indicated) and a minor coupling 14. the major coupling 12 is so named because it involves the primary beam of the vehicle frame and additionally because a clean coupling, without substantial enlargement is required, and which has the capability of affixing a pair of members together in axial alignment.

The rear-wheel section R, as depicted in FIG. 1, includes drive elements as considered in detail below. However, the primary drive train is embodied in the engine section E. Generally, an axial fastener in accordance herewith, affixes the rear-wheel section R to the rear portion of the engine section E.

In addition to the separable components illustrated in FIG. 1, the disclosed embodiment also provides for the separation of a seat 18, a fuel tank 20, a handlebar structure 22 and a rear fender (not shown in FIG. 1). The details of these elements, bearing similar reference numerals, are treated below and are illustrated in FIG. 2, which will now be explained.

Apart from the coupling structures which permit the vehicle to be rapidly transformed between an operative state and a state for storage, the vehicle is a conventional structure. Specifically, front and rear wheels 21 and 23 are supported by forked extensions from a central frame which is principally embodied in the engine section E. Drive power is provided to the rear wheel 23 from an engine 25 through a chain drive 27. As indicated above, these and other components of the vehicle (excepting the couplings explained below) may be conventional. In fact, the illustrative embodiment disclosed herein has been produced in substantial numbers from production vehicles.

Considering the individual couplings and related structures whereby the illustrative embodiment may be reduced to a compact form, reference will now be made to FIGS. 3 and 4 in the course of a description of the major coupling 12 and the minor coupling 14. The major coupling 12 includes, a lower coupling member 24 which is rigidly affixed to the engine section E extending as a somewhat horizontal beam, and an upper coupling member 26 which is affixed to similarly extend from the front-wheel section F. The mating portions of the coupling members 24 and 26 are illustrated in FIG. 4 along with a multiple-use wrench-stud device 28, including an elongated Allen wrench 29 as well known in the prior art, having a stud 31 affixed to extend perpendicularly from the elongated portion of the wrench. The threaded stud 31 comprises high-tension steel and, as disclosed is welded to the wrench 29.

The lower coupling member 24 terminates in a semi-cylinder 30 defining a flat surface 32 which faces a similar opposed surface 34 which is defined by a semicylinder 36 of the coupling member 26. The surface 32 carries a pair of integral conical extensions 38 and 40, the tapered surfaces of which are matingly received in a pair of recesses 42 and 44 (shown in phantom) defined to extend into the semi-cylinder 36 from the surface 34. The semi-cylinder 36 also defines a radially-extending bore 46 with an internal shoulder 47. The bore 46 is matingly aligned with a threaded bore 48 extending into the semi-cylinder 30 perpendicularly to the surface 32. Accordingly, with the flat surfaces 32 and 34 in facing relationship, a stud 31 can be inserted through the bore 47 and turned into mating engagement with the bore 48 until the head 52 of the stud clampingly engages the shoulder 47 locking the coupling members 24 and 26 in aligned engagement. Accordingly, the major coupling joins the major frame member of the vehicle. It is to be noted that when joined, the surfaces 32 and 34 are spaced apart, e.g., by 0.010 inch – 0.030 inch.

The minor coupling 14 (FIGS. 2 and 3) joins a downwardly-extending portion of the frame. Structurally, the minor coupling consists of a pair of abutting flange plates 60 and 62 which are affixed together by a pair of threaded studs 64 that extend through the plate 62 for a threaded engagement with the plate 60. The studs 64 have Allen heads for engagement with the wrench 29 (FIG. 4). For convenience in aligning the flange plates 60 and 62, a pair of corner angles 68 are affixed to the lateral ends of the plate 62. Thus, a convenient, rigid coupling structure is provided.

Figure 7:
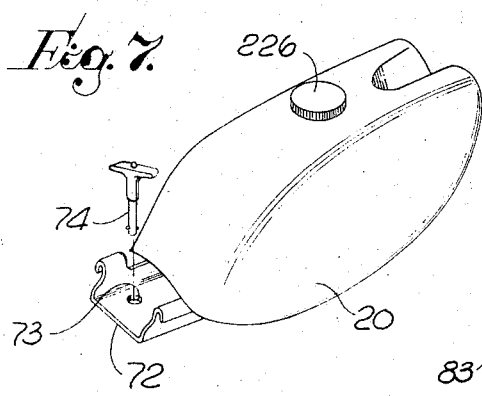
FIG. 7 is a perspective view of the fuel tank portion of the motorcycle of FIG. 2.

Closely physically related to the major coupling 12 (FIG. 2) is the gasoline tank 20. Generally, the underside of the tank slips into engagement with the main frame and a fastening retains the tank 20 in position. Specifically, as illustrated in FIG. 7, the tank 20 is affixed to a locking channel 72 which defines a bore 73 for passing a quick-connect fastener pin 74 that is received in a bore (not shown) in the engine section E (FIG. 2). Thus, the gas tank 20 is locked in position over the major coupling 12 with the wrench-stud device 28 (FIG. 3) thereunder captured against rotation. Accordingly, the stud 31 (FIG. 4) is locked in place.

Figure 8:
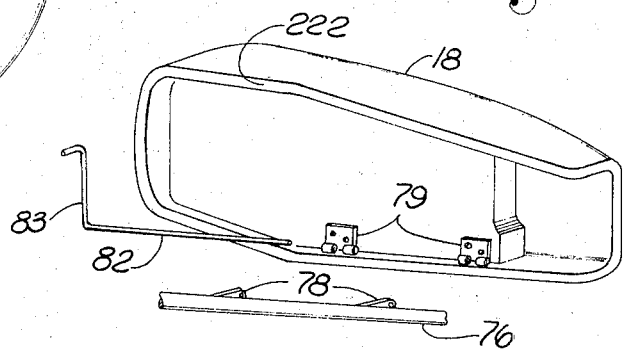
FIG. 8 is a perspective view of the seat portion of the motorcycle of FIG. 2.

Behind the tank 20 (FIG. 2) the seat 18 is affixed to the engine section E by a simple pivot structure. Specifically, one of the frame bars 76 (FIG. 8) located at the upper rear of the engine section E, carries a pair of lateral extension brackets 78 which define holes that are matingly aligned with female pin couplings 79 which are affixed to the seat 18. Accordingly, the seat 18 is affixed to the engine section E by aligning the pin couplings 79 with the brackets 78 and inserting an elongated rod 82 through the aligned apertures. A locking extension 83 at the end of the rod 82 drops to engage the engine section E so as to retain the rod 82 in position.

At a location behind the seat 18 (FIG. 1) the engine section E also receives a rear fender component 90. In general, any of a variety of quick-connect structures may be employed at this junction as the load is rather nominal and various devices exist. For example, snap locks as widely used in various fastener applications may be employed to attach the fender component 90 to the engine section E. Generally, the detailed structure of such locks is merely ancillary hereto.

Figure 6:
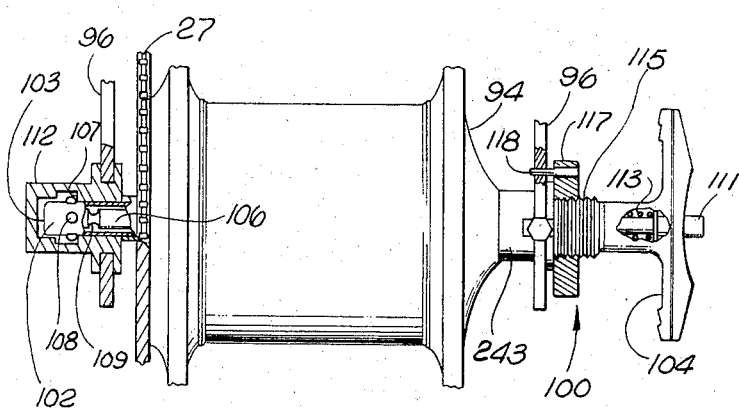
FIG. 6 is a partly sectioned view taken somewhat centrally through the structure of FIG. 5.

Of somewhat greater mechanical significance to the operation of the vehicle, somewhat within the fender component 90, the rear-wheel section R is affixed to the engine section E. The rear-wheel section R consists primarily of the wheel 23; however, drive-coupling structure 93 is incorporated in the section at the wheel axis. In accordance with conventional construction, the rear-wheel section R is affixed to the engine section E by an axial coupling. However, in accordance herewith, a specific form of axial coupling is employed as will now be considered in detail with reference to FIG. 6. Generally, the rear-wheel section is affixed at the hub 94 of the wheel 23 to the forked frame 96 by an axial pin or shaft assembly 100. An elongated hollow shaft 102 of the shaft assembly 100 extends in locking engagement between the forks of the frame 96 and through the axis of the hub 94. The shaft 102 is closed at one end 103 (left) and carries an affixed externally-threaded handle 104 at the other end (right). An internal elongated spring-loaded pin 106 extends telescopically within the shaft 102 for supporting and relieving a set of radially-extending balls 108 which are loosely supported in radial bores in the shaft 102. The balls 108 engage a shoulder 107 and are held in position by the pin 106. At a location adjacent the balls 108, the elongated pin 106 defines an annular groove 109 so that by depressing an extending portion of the pin 106, from the handle 104 as by a button 111, the internal shaft is moved to the left allowing the balls 108 to be received in the groove 109. Thus, upon depressing the extending portion 111 against the force of an internally-mounted spring 113 the balls 108 are relieved allowing the shaft assembly 100 to be inserted through the hub 94 and similarly removed.

As suggested above, the external shank of the handle 104 carries a threaded section 115 which receives an engagement nut 117. An axially parallel pin 118 extends from the disk-shaped nut 117, to be received for locking engagement in a mating bore (as shown) defined in the frame 96. After placement of the shaft assembly 100 through the hub 94, the nut 117 is locked against rotation by the engagement between the pin 118 and the frame 96. The handle 104 is then turned with the result that the shaft 102 and the threaded section 115 revolve while the nut 117 remains stationary. As a consequence, the balls 108 are drawn into firm engagement with the shoulder 107 inside a closed bushing 112. In that manner, the shaft 102 is tensioned for locking engagement, while fixing the hub 94 for rotation with reference to the frame 96. Accordingly, the rear wheel 23 incorporating the hub 94 is locked in position to be turned by the chain drive 27.

A shaft assembly fastener somewhat similar to the shaft assembly 100 is also employed to affix the handlebar structure 22 (FIG. 2) to the front-wheel section F. The details of that structure will now be considered with reference to FIG. 9. The upper portion of the front-wheel section F (FIG. 9) defines a pair of spaced-apart upwardly-extending ridges 119 and 121 which are generally similar. The ridge 119 defines a detent 127 which is axially aligned with a similar detent 129 in the ridge 121. A bore 131 is located between the ridge 119 and 121 and an open-head stud 133 passes therethrough, at the pivot point for turning the front wheel 21 (FIG. 20.

The removable handlebar structure 22 (FIG. 9) matingly engages the front-wheel section F as described above. Specifically, the handlebar structure 22 includes the handlebars 135 which are clamped between a body 137 and a pair of brackets 139 and 141. Specifically, studs 143 pass through the brackets 139 and 141 to be threadably engaged in the body 137. As described, the handlebar structure 22 is an integral assembly and is affixed to the front-wheel section F by placement of a shaft fastener 145 which is similar to the shaft assembly 100 previously described with reference to FIG. 6; however, employing a different structure for capturing the nut. The shaft assembly 145 extends through a somewhat cylindrical portion 147 of the body 137 and the balls 146 are locked into engagement with an internal shoulder 149 defined in the stud 133. A nut 155 is captured in a mating slot 156 which is defined in the cylindrical portion 147. In affixing the handlebar structure 22 to the front-wheel section F, the two members are mated together so that the head of the stud 133 is received in a bore 151 of the cylindrical portion 147, and cylindrical extension 153 are received in the detents 127 and 129. Thereafter, the fasterner 145 is set in position and the handle 156 is turned down to accomplish a locking tension.

In view of the above structural considerations of the various major coupling structures in the vehicle, as represented in FIG. 2, a complete understanding of the use and operation thereof may now be best accomplished by assuming the vehicle is assembled and explaining the operation of separating the components as depicted in FIG. 2 while concurrently introducing additional detailed structure. To desassemble the vehicle, a pair of support standards 215 (FIG. 5) are initially lowered to a supporting position as illustrated in phantom. The standards 215 iclude a stand bar 216 that is pivotally affixed to the engine section E and a latching bar 221 that is similarly affixed. In the lowered position, a latch pin 219 (extending normally from the bar 216) is lockingly received in a detent 217 in the bar 221. Thus, the standards 215 are locked in a supporting position enabling the vehicle to be rocked without danger of collapse.

Figure 9:
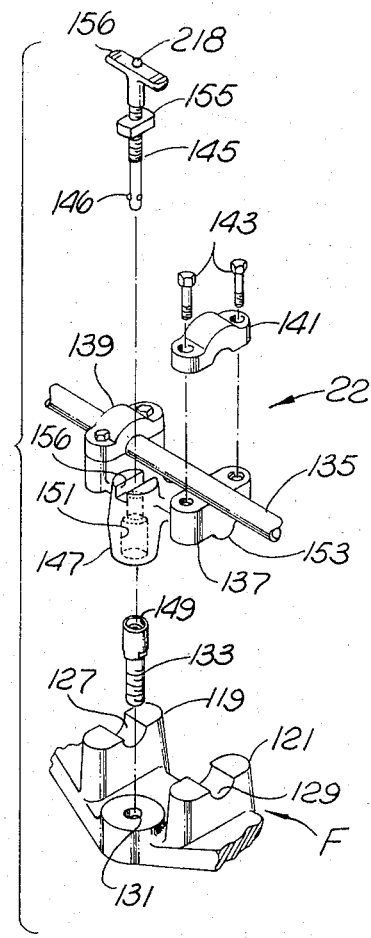
FIG. 9 is an exploded perspective view of the handlebar structure as embodied in the unit of FIG. 2.

With the standards 215 lowered, the first step in the take-down operation involves removal of the seat 18, fuel tank 20 and rear fender component 90. Specifically, the seat 18 (FIG. 8) is removed by lifting the free side 222 for access to the rod 82 which is withdrawn to free the couplings 79 in turn freeing the seat 18. The fuel tank 20 (FIG. 2) may be removed next by disconnecting the line at a couplinng 224 then removing a fastener 74 (FIG. 7). The fuel tank may then be removed freely from the vehicle. In the interest of safety, it may be advisable to drain the tank 10 and/or utilize a sealed cap 226 providing an effective seal in combination with a petcock incorporated in the coupling 224 (FIG. 2). The next step involves removal of the handlebar structure 22 (FIG. 1). Referring to FIG. 9, separation of the handlebar structure 22 simply involves turning the handle 156 to relieve the tension in the shaft assembly 145, after which the release button 218 is depressed, releasing the shaft assembly 145 for withdrawal from the stud 133 and the cylindrical portion 147. The handlebar structure 22 may then be simply lifted from engagement with the front-wheel section F.

The handlebar structure 22 (FIG. 2) is then placed adjacent the engine section E as indicated in phantom and affixed in that location by the fastener assembly 145 (FIG. 9). As a consequence, cables, e.g., 220 (FIG. 2) need not be opened or disconnected. Considerable simplification results from such an arrangement in reducing the vehicle to a compact form.

The rear fender component 90 may be next removed. The removal of the rear fender component 90 leaves the vehicle stripped and ready for separation into the major components of the front-wheel section F, the engine section E and the rear-wheel section R.

The first step in the separation of the major components is the removal of the wrench-stud device 28 (FIG. 4). That is, the wrench 29 is employed as a handle for turning the threaded stud 31 out of engagement with the bore 48. Thereafter, the wrench 29 is employed to remove the studs 64 (FIG. 3) from the minor coupling 14. The final step in accomplishing the separation involves the disconnection of electrical couplings 230 which are provided in the cables 232. Thereafter, the front-wheel section F is removed as a component that may be readily handled and stored.

The removal of the front-wheel section F involves pivoting the remaining assembly forward about the standards 215 (FIG. 5) to elevate the rear wheel. Thereafter, a spring pin 234 is removed to release the brake stabilizing rod 236. A retaining nut 238 is also removed from the brake actuating rod 240 so as to free the rod from engagement with an actuating arm 242. Thereafter, the shaft assembly 100 may be withdrawn from the hub 94 (FIG. 6) to release the rear wheel. Specifically, the operation simply involves turning the handle 104 so that the threaded section moves toward the hub 94 through the nut 117 until the shaft 102 is moved to separate the balls 108 from the shoulder 107 and relieve the tension in the shaft. Then by depressing the extending button 111 the balls 108 are permitted to drop inside the shaft 102 permitting withdrawal. Upon withdrawing the shaft assembly 100, a spacer 234 is removed from the hub 94. The rear-wheel section R is then free for removal.

As a final step in the take-down procedure, the engine section is fitted in a flat pan 244 which carries wheels 246 at one end. The pan 244 enables the engine section E to be wheeled about and additionally serves as a barrier and container for dirt and oil. Of course, to afford further protection in that regard, the elements may be fitted with coverings of sheet material, e.g., plastic.

With the motorcycle as disclosed herein reduced to the components as disclosed above, it may be compacted into a relatively small space for storage or transportation.

Of course, other portions can also be separated. For example, the front wheel 21 can be fitted for convenient removal by use of a structure similar to that described with reference to FIG. 6.

To assemble the components as an operable vehicle, a procedure reverse to that outlined above is followed. Without repeating the detail, the rear-wheel section R is first affixed to the engine section E after which the front-wheel section F is similarly affixed. Various fittings and couplings are engaged and the smaller components are then affixed. Accordingly, the vehicle is ready for operation.

Generally, the construction hereof affords a unit which involves little, if any, compromise in relation to a conventional motorcycle. That is, embodiments of the present invention have been found to be exceedingly rugged and totally satisfactory for operation both on highways and trails. In that regard, it is noteworthy that the major coupling 12 translates various applied loads into stress loads on the stud 31 (FIG. 4). That is, either torsion or bending loads applied to the coupling tend to apply separating forces to the surfaces 32 and 34. This action occurs due to the mating axially-tapered surfaces provided between the extensions 38 and 40 and the recesses 42 and 44 which are the sole contact surfaces of the coupling. That is, the semicylinders 30 and 36 (FIG. 4) are in contact only at the tapered surfaces. Thus, force resolution and alignment may occur. Accordingly, the mating engagement of such tapered surfaces serves this function in addition to that of aligning the beams which are coupled together.

Although it will be readily apparent to one skilled in the art that the vehicle as disclosed herein may be varied to a considerable extent, certain salient considerations are applicable. For example, the separation or division locations, the nature of certain of the couplings, the manner of handling the separated components are somewhat critical to the present invention. However, in view of the numerous possibilities, and in accordance with convention, the scope hereof shall be as defined by the claims set forth below.

What is claimed is:

1. A motorcycle construction that facilitates disassembly, as for transportation, including:
   a front-wheel section including a front wheel, a first frame segment supportig said front wheel and a first coupling means affixed to said first frame segment;
   an engine section including an engine, drive structure, a second frame segment supporting said engine and drive structure, a second coupling means for engagement with said first coupling means, to rigidly fix said frame sections together, and a loading tray affixed under said engine including at least one wheel rotatably mounted on said tray;
   stud means for releasably locking said first and second coupling means in mating engagement; and
   a rear-wheel section including a rear wheel and means for affixing said rear wheel to said second frame segment.

2. A motorcycle construction according to claim 1 further including a handlebar structure and a coupling member for releasably affixing said handlebar.

3. A motorcycle construction according to claim 2 further including means for affixing said handle bar structure to said motorcycle construction at a location separated from location of steering relationship.

* * * * *